United States Patent
Stewart et al.

(10) Patent No.: US 6,389,036 B1
(45) Date of Patent: May 14, 2002

(54) AIRLINK TRANSPORT CONTAINER

(75) Inventors: Jeff M. Stewart, Snohomish; Deane Osborne, Redmond; Scott Gene Garat, Bothell, all of WA (US)

(73) Assignee: Harris Breedband Wireless Access, Inc., Bellevue, WA (US)

( * ) Notice: Subject to any disclaimer, the term of this patent is extended or adjusted under 35 U.S.C. 154(b) by 0 days.

(21) Appl. No.: 09/213,641

(22) Filed: Dec. 17, 1998

(51) Int. Cl.[7] .................................................. H04J 3/22
(52) U.S. Cl. ........................ 370/466; 370/345; 370/521; 370/907
(58) Field of Search .................. 370/400, 401, 370/419, 465, 466, 467, 470, 474, 476, 535, 545, 352, 404, 405, 345, 521, 907, 468, 477

(56) References Cited

U.S. PATENT DOCUMENTS

| | | | | |
|---|---|---|---|---|
| 4,967,405 A | * | 10/1990 | Upp et al. | 370/465 |
| 5,067,126 A | * | 11/1991 | Moore | 370/544 |
| 5,111,485 A | * | 5/1992 | Serach | 370/504 |
| 5,131,013 A | * | 7/1992 | Choi | 370/506 |
| 5,189,410 A | * | 2/1993 | Kosugi et al. | 370/470 |
| 5,490,142 A | * | 2/1996 | Hurlocker | 370/465 |
| 5,579,323 A | * | 11/1996 | Krishner | 370/476 |
| 5,850,387 A | * | 12/1998 | Lyon et al. | 370/250 |
| 6,161,203 A | * | 12/2000 | Zuranski et al. | 714/707 |
| 6,188,701 B1 | * | 2/2001 | Tsukamoto et al. | 370/535 |

* cited by examiner

Primary Examiner—Ricky Ngo
Assistant Examiner—Phuc Tran
(74) Attorney, Agent, or Firm—Duane Morris LLP

(57) ABSTRACT

A system and method for transparently transporting SONET virtual tributaries over a airlink are shown and described. According to a preferred embodiment of the present invention a hub is coupled to a SONET fiber optic channel which is adapted to receive and transmit SONET data packets over the fiber and to receive and transmit this information in a more efficient transport container over a wireless link to a remote subscriber system. Efficiency of bandwidth is achieved in the preferred embodiment through the use of compression of overhead bytes, dropping unnecessary path overhead information, dropping of redundant information, discarding reserved space, carrying payload in place of repetitive overhead information, and utilizing efficient error correction techniques.

34 Claims, 8 Drawing Sheets

AIRLINK TRANSPORT CONTAINER

BACKGROUND

It is often desirable to communicate information digitally. In particular, voice and/or data information carried over various communication networks are often transmitted digitally. For example, in North America standards have been established for a digital hierarchy to transmit digital bit streams in various multiplexing levels. These digital signals are referred to as DS-n, wherein n refers to the multiplexing level of the digital signal stream.

In order to provide control and maintenance functions associated with the digital transmission of data, the digital data streams are divided into overhead and payload. Overhead functions include framing, error checking, and maintenance. Payload capacity is used to carry signals delivered from the next lower level or delivered directly to the multiplexer by a subscriber.

The transmission of digital data streams may be synchronous or asynchronous. The transmission of bit streams according to the DS-n standards is asynchronous. Whereas, synchronous optical network (SONET) is a synchronous transmission vehicle that is capable of synchronous transmission of payloads in the gigabit range. In order to transmit asynchronous data packets, such as the aforementioned DS-n data streams, standards have been established to carry asynchronous data streams in a synchronous bundle, such as those of SONET.

However, as the asynchronous data packets transported by the synchronous bundles may have a velocity both with respect to the synchronous bundle and themselves, i.e., the asynchronously supplied data may drift in its relative placement within the synchronous transport container, the use of various overhead bytes, such as pointers, are used. For example SONET utilizes a pointer which indicates the alignment of the payload within the SONET bundle. Moreover, as the asynchronous payload is allowed to drift within the synchronous transport container, often the only bits/bytes that are placed within the transport container bundle at a fixed position are ones of the above described overhead bits/bytes, such as the pointer bits/bytes, thus adding complexity to any downstream operation with respect to the payload. Yet further complexity is introduced in order to accommodate variation in the rate input of the asynchronous bit stream, as use is often made of positive stuff bits/bytes to accommodate slower than nominal bit rates and/or negative stuff bits/bytes to accommodate faster than nominal bit rates.

In order to transmit a large amount of information and the associated overhead bits/bytes, a substantial amount of bandwidth is required. For example, the above described SONET communication standard is capable of transmission in the gigabit range. However, such large bandwidth links are not always available to all subscribers seeking communication over such a network. For example, a subscriber may be located in a building not served by an fiber optic trunk, nor may such service be cost effective. Likewise, a subscriber may be located remotely, substantially isolated, from any urban area having large bandwidth communication infrastructure.

Accordingly, there is a need in the art for providing a link adapted to allow such subscribers to communicate via an established network infrastructure, which is more cost effective and/or easier to deploy. For example, wireless point to point or point to multi-point links may be simply and cost effectively deployed to provide links with existing communication infrastructure and such subscribers not initially served by the infrastructure. However, such secondary links may not be able to provide the same bandwidth or may otherwise require the repackaging of communicated information in order to provide the desired link attributes. For example, the above mentioned wireless links may be bandwidth limited and, therefore, benefit from the use of more efficient data transport containers in order to provide data throughput commensurate with that of the established network infrastructure.

However, as such a link is to provide communication between a remote subscriber system and an established network infrastructure, the link is preferably transparent. Transparency may be achieved through the communication of data packets native to the established network infrastructure. Although the payload might be dropped out of the communication network's native data packets, i.e., the transport containers demultiplexed, and broken down to their lowest level of raw data, for transmission over such a secondary link and therefore native data packets fully reassembled from this raw data at the receiving end, this requires time, adding latency, as well as requiring substantial processing power and equipment. Accordingly, there is a need in the art to provide the aforementioned link communicating as high of level of native data packet as possible in order to reduce latency and equipment requirements. There is a further need in the art for the transport container used by such a link to accommodate drift in the placement of payload within the native data bundle.

SUMMARY OF THE INVENTION

These and other objects, features and technical advantages are achieved by a system and method in which a transport container is utilized to carry relatively high level communication network native data packets from a hub or other equipment coupled to the communication network infrastructure to a remote, or plurality of remote, network nodes. In a preferred embodiment of the present invention the link utilized for transporting the information utilizes a radio frequency (RF) carrier where the data transport container is specifically adapted to allow the transport of more payload/bandwidth.

In a preferred embodiment the transport container is an airlink transport container (ATC) adapted to transport communication network native data packets. For example, where the communication network to which the aforementioned hub is coupled is a SONET network, the network native data packet is preferably a VT1.5 transport container. This is preferred as, especially at the hub portion of the link, there may be a large concentration of traffic, up to 336 VT1.5s each containing a DS-1 at the hub. By transporting the higher level VT1.5 data packets, instead of the lower level DS-1s included therein, dropping 336 DS-1s from their VT1.5 containers, i.e., removing the DS-1s from their VT1.5 transport containers and framing them up, is avoided. This is advantageous as the circuitry to drop this number of DS-1s from their containers is considerable in cost, space, power consumption, etcetera.

Moreover, advantages are realized in transporting the higher level data packets in subscriber end flexibility. For example, the preferred embodiment transporting VT1.5 transport containers within the ATC of the present invention are able to interface with SONET equipment at the subscriber premises thus providing a truly transparent SONET type link. Additionally, or alternatively, only relatively few (in the preferred embodiment 1 to 11) DS-1 s (those actually transported) need be dropped from an RF carrier at the subscriber side for interfacing with DS-1 equipment, thus avoiding dropping all DS-1s from their VT1.5 containers at the hub when only a portion are actually used at the remote site.

In the preferred embodiment the transport container of the present invention is a synchronous transport container that can accommodate multiple asynchronous payloads. These asynchronous payloads need not have a fixed timing relationship to each other or to the transport container of the present invention. Accordingly, the present invention is adapted to accommodate the DS-1 payload envelope floating within its VT1.5 transport container.

The transport container of the present invention, although providing communication of the relatively high level native data packets is adapted to do so with improved bandwidth efficiency through the use of compression of overhead bytes, dropping of redundant information, discarding reserved space, carrying payload in place of repetitive overhead information, utilizing more efficient error correction techniques, and the like. However, the transport container of the preferred embodiment of the present invention is transparent in that, from the perspective of the payload, it is as though the transport container is not in the circuit at all. Accordingly, the preferred embodiment of the transport container does not cause frame slips and does not require slip buffers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
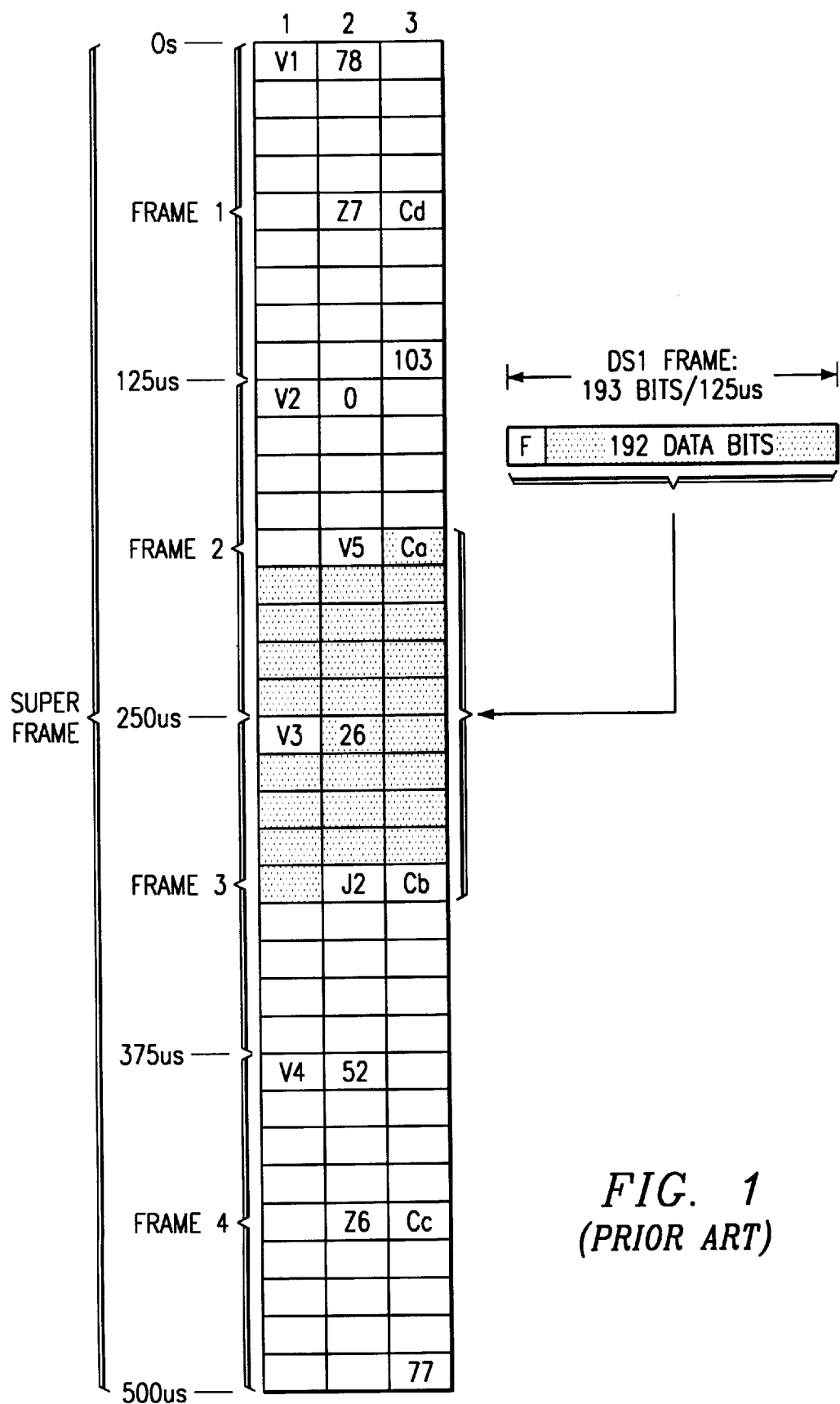
FIG. 1 shows a bit mapping of a prior art VT1.5 transport container.

In understanding the present invention it is helpful to discuss existing signaling standards for which the present transport container is suitable for use. It shall be appreciated however, although reference to specific signaling standards and/or associated equipment is made herein, the present invention is not limited to use with the described signaling standards or equipment.

Following the dissolution of the Bell System, the Exchange Carrier Standards Association (ECSA) became responsible for the maintenance and development of the North American telecommunications standards. ECSA has established various standards for bit streams of the various multiplexing levels in the North American digital hierarchy. The various rates in the digital hierarchy are termed digital signal n (DS-n), where n is the specified level in the hierarchy.

The capacities of the bit streams of the various multiplexing levels in the North American digital hierarchy are divided into overhead and payload. Overhead functions include framing, error checking, and maintenance functions. Payload capacity is used to carry signals delivered from the next lower level or delivered directly to the multiplexer by a customer.

The transmission of bit streams according to the DS-n standards is asynchronous. However, a synchronous signaling standard has been established, synchronous optical network (SONET), which is a physical transmission vehicle that is capable of transmissions in the gigabit range and is defined by a set of electrical as well as optical standards. Accordingly, ECSA has established standards to carry asynchronous data streams such as DS-1 in a SONET bundle.

The basic building block in SONET is the synchronous transport signal level-1 (STS-1). It is transported as a 51.840 Mb/s serial transmission using an optical carrier level-1 (OC-1) optical signal.

Higher data rates are transported in SONET by synchronously multiplexing N lower level modules together. Optical carrier level-N (OC-N) and synchronous transport level-N (STS-N) correspond to the optical and electrical transmissions, respectively, of the same data rate. Accordingly, OC-1/STS-1 correspond to a line rate of 51.84 Mb/s, OC-3/STS-3 correspond to a line rate of 155.52 Mb/s, OC-12/STS-12 correspond to a line rate of 622.08 Mb/s, etcetera, where the maximum value of N is limited by the requirement that each individual STS-1 is allocated only one 8-bit identification value and this value must be unique.

Even though SONET is physically serially transmitted, it is conceptually simpler to think of in terms of bytes. In fact, hardware implementations of SONET systems do the majority of the processing in terms of bytes rather than bits.

The SONET STS frame structure has two parts, the transport overhead and the synchronous payload envelope (SPE). The SPE may include four different sizes of payloads, which are named virtual tributaries (VT). The four VTs are the VT1.5, VT2, VT3, and VT6. In a given STS-1 frame, a single VT1.5 occupies 3 columns out of 87, therefore it is possible to have 28 VT1.5s located in an STS-1 frame. A single VT2 occupies 4 columns, making it possible to have 21 VT2s in an STS-1 frame. A VT3 occupies 6 columns, thus 14 total may be accommodated in a single STS-1 frame. A VT6 occupies 12 columns, thus 7 total are possible in an STS-1 frame. Accordingly, SONET OC-3 transport may transport 84 floating VT1.5s where each VT transports a single DS1 (the 1.5 in VT1.5 refers to the nominal data rate of a DS-1 which is 1.544 Mb/s).

Shown in FIG. 1 is the mapping of DS-1 data to a VT1.5 transport container having three columns as described above. A VT requires four STS-1 frames (a 500 $\mu$s structure) for transmission, shown in FIG. 1 as frames 1–4. These required four frames are named a superframe.

Inside the bytes which make up the four frames of a given VT, are the special bytes named V1, V2, V3, and V4. The V1 and V2 bytes make up a VT pointer, which indicates the alignment of the asynchronous payload envelope within the allocated VT bytes independent of the other VTs in the same STS-1. The use of such pointers is necessary in order to accommodate the synchronous transmission of an asynchronously sourced signal.

The V3 byte is allocated as the negative justification (stuff) opportunity byte for the VT. The byte immediately after the V3 byte is the positive justification (stuff) byte opportunity.

The V4 byte is an undefined byte, i.e. not presently used. The V1–V4 bytes are the only bytes whose position within the VT superframe is fixed. The remaining bytes in a VT are used for the various mappings of DS-1, DS-2, E1, etcetera into the various VTs.

The V1 and V2 VT pointer bytes point to the first byte of the VT payload. This first byte of the VT payload is a byte named the V5 byte. The V5 byte contains overhead information about the payload contained within the VT. The V5 byte includes error checking in the form of a 2-bit BIP-2, a far end block error (FEBE) bit, path signal identification, and a downstream equipment error indication.

The VT payload envelope consists of the VT path overhead bytes V5, J2, Z6, Z7, combinations of bits, referred to herein as the Ca, Cb, Cc, and Cd bytes (where Ca consists of the bits $RRRRRR_fR$, Cb consists of the bits $C_1C_2 OOOOI_2R$, Cc consists of the bits $Cl_2C_2 OOOOI_3R$, and Cd consists of the bits $Cl_3C_2_3RRRS1S2R$), and four 192 bit DS-1 data. Since the nominal DS-1 data rate is 193 bits/frame, one bit is transported in the Ca–Cd bytes in the $I_1$, $I_2$, or $I_3$ bit positions. In this way the equivalent of a single DS-1 frame is mapped into a single VT frame.

Bit positions $C1_1$, $C1_2$, $C1_3$, $C2_1$, $C2_2$, and $C2_3$ are stuff control bits of the VT1.5 transport container. Bit positions S1 and S2 are stuff opportunity bits of the VT1.5 transport container.

As shown in FIG. 1, the payload envelope may straddle two VT frames. This is because the payload envelope is allowed to float on the synchronous VT transport. The VT pointer is dynamically adjusted to identify the beginning of the payload envelope. In SONET parlance this is described as a VT1.5 which is in floating mode and asynchronously mapped. Floating mode and asynchronous mapping is the dominant VT format for DS-1 transport over SONET where DS-0 accessibility is not a priority.

SONET, although providing a suitable solution to transmitting a large amount of data initially presented in asynchronous data packets, requires, by definition, a fiber optic link and a large bandwidth. However, fiber channels, as with any large bandwidth channels, are typically expensive to establish and, therefore, the infrastructure is not often deployed where needed. Accordingly other communication links have been established to service customers in areas not coupled via fiber optic links.

One such alternative communication link is a wireless communication link, such as in the gigahertz (mmWave) frequency band. Links utilizing mmWave communications are found in point to point communication systems and, more recently, are being developed for point to multipoint systems. However, such wireless, or air, links are generally limited in bandwidth. For example, a governmental regulatory agency may parse up the available spectrum for use in establishing various different communication links. Additionally, wireless communication equipment, such as transmitter and receiver units, are limited in the amount of bandwidth that they can accommodate.

Therefore, although presenting a viable solution to establishing communication links with physical locations not coupled to a fiber optic link or other high bandwidth communication infrastructure, wireless links may not initially appear to provide bandwidth sufficient to service communications currently serviced by large bandwidth links such as fiber optics communicating according to SONET standards. This problem is compounded by the fact that the synchronous communication of the asynchronous data relies upon the relatively large amount of overhead data appended to the payload.

Moreover, the appearance of wireless links to be unsuitable for SONET type communication is further emphasize by the fact that the actual transmitted data is several layers deep in the SONET data. For example, there are several layers of multiplexing that occur to build a VT1.5 mapped OC-3. Twenty-four DS-0 channels are multiplexed together and a framing bit is added to build a DS-1 frame. The frame rate is 8000 frames/second and each DS-0 channel is 8-bits wide, making the DS-0 data rate 64 kb/s, and the DS-1 data rate 24.125 times faster, or 1.544 Mb/s, where the 0.125 is due to the framing bit. A VT1.5 transports a single DS-1 and the associated VT pointer and VT overhead, making its data rate 1.728 Mb/s. Twenty-eight VT1.5s are multiplexed together and overhead is added to build a 51.84 Mb/s OC-1. Three OC-1s are multiplexed to build a 155.52 Mb/s OC-3. Accordingly, if it were desired to drop the underlying data, such as a DS-1, out of the SONET data, such as to transmit this data via a wireless link with reduced overhead, it would require a substantial amount of processing time and resources.

The present invention operates to use data substantially as presented for transmission by the link, such as the aforementioned SONET data products, in its transmission thereof Accordingly, the present invention is adapted to provide the transparent transport of data native to an established communication network without introducing substantial latencies. As such systems of the present invention may be utilized to bridge existing portions of communications networks and/or provide network communication links where infrastructure has heretofore been unavailable for deployment.

A preferred embodiment of the present invention, although preserving a relatively high layer of the SONET data packet, actually operates to compress the native network data packets for wireless transmission. Specifically by discarding reserved space, discarding path overhead bytes reducing the occurrences of redundant bits, and/or by use of more efficient error correction techniques compression of the data packets for wireless transmission may be achieved in the 10 percent range, i.e., 27 bytes of SONET data may be compressed for wireless transmission as 24.5 bytes.

However, a price is paid due to this compression in the form of some transmission latency, as well as termination of the VT path although in practice a VT path may be re-established so as to appear to be two pieces of termination equipment disposed in the signal path.

According to the present invention a conversion apparatus, such as may be included in a network terminal device, is coupled to a communication network, such as a SONET network, and a corresponding conversion apparatus is coupled to a remote network device, such as a termination device, in order to transparently communicate network data there between. Preferably, the conversion apparatus of the present invention is disposed in a network hub, in order to accept network communication data and provide the network native data packets to the conversion apparatus for transmission according to the present invention.

In the preferred embodiment, the link between the conversion apparatus disposed at the communication network and the corresponding conversion apparatus remotely disposed is a wireless link, such as a mmWave radio frequency (RF) link. For example, the conversion apparatus disposed at the communication network may be a hub device providing point to multi-point communications, where the aforementioned corresponding conversion apparatus is but one of a plurality of corresponding conversion apparatuses. Of course, the present invention may provide communication over links other than the aforementioned wireless link, if desired. For example, the improved utilization of available bandwidth may be desired in communications over wired links where bandwidth is a concern, such as where communication services are superimposed upon an existing infrastructure such as a cable system. Moreover, it should be appreciated that aspects of the present invention may be utilized in improving communications over networks such as the aforementioned SONET network.

Figure 2:
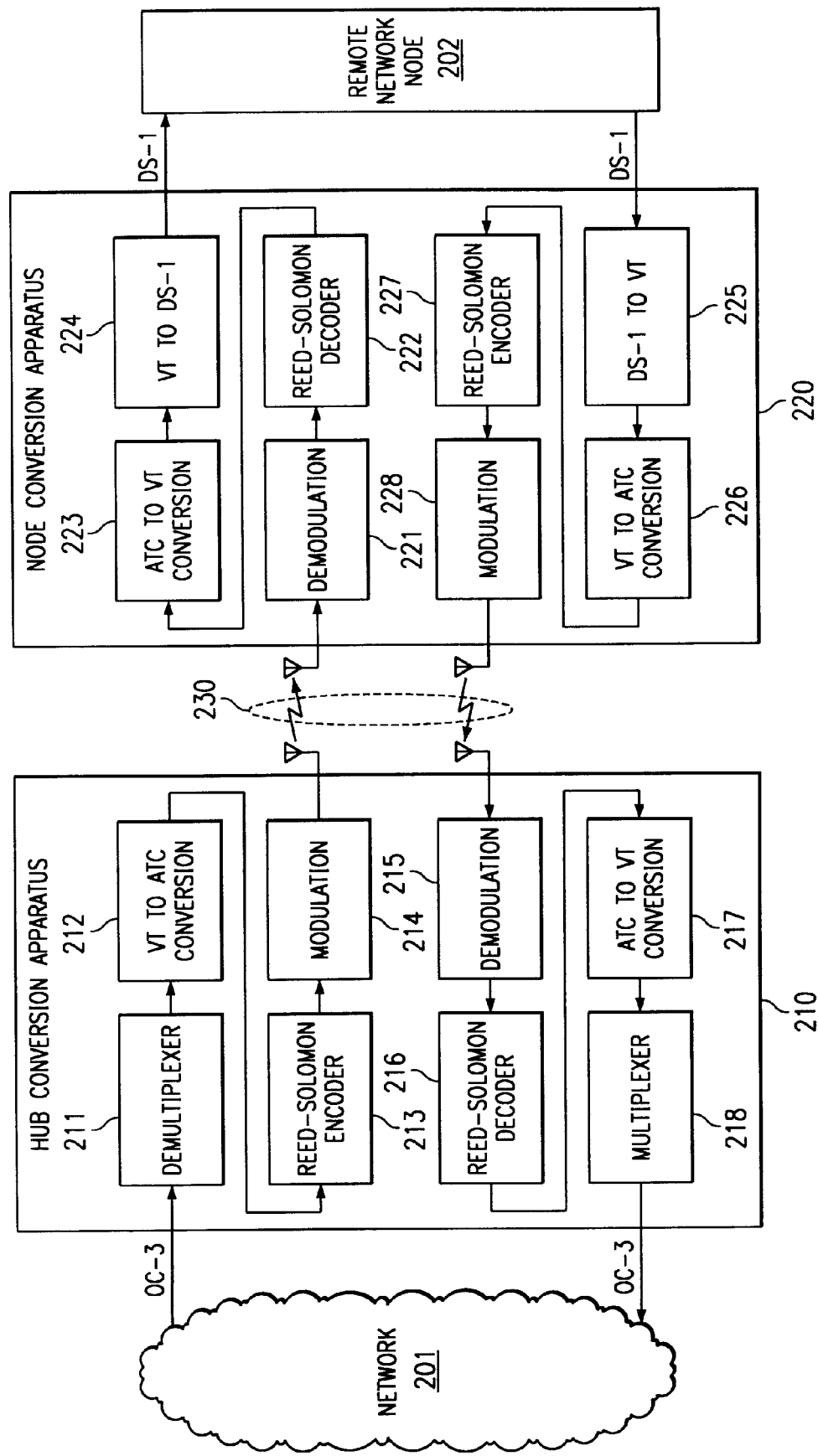
FIG. 2 shows a system adapted to operate according to a preferred embodiment of the present invention.

Directing attention to FIG. 2, a block diagram of a preferred embodiment of the present invention is deployed in system 200. System 200 includes hub conversion apparatus 210 coupled to SONET network 201 and in communication via link 230 with node conversion apparatus 220 coupled to remote network node 202.

Hub conversion apparatus 210 includes demultiplexer 211 and, a VT to airlink transport container (ATC) converter (VT to ATC converter 212) of the present invention to accept the network data packets, demultiplex the data packets into their VT components, and to convert the VT transport containers to ATCs. Reed-Solomon encoder 213 and radio frequency (RF) modulator (modulator) 214 are coupled to VT and ATC converter 212 in order to error correction encode the ATCs and to modulate the ATCs for airlink transmission via link 230. Hub conversion apparatus 210 also includes demodulator 215, Reed-Solomon decoder 216, ATC to VT converter 217 of the present invention, and multiplexer 218 in order to demodulate the RF transmission, decode the Reed-Solomon encoded ATCs, convert the ATCs to VT transport containers and multiplex the individual VTs for transmission over the SONET network.

Node conversion apparatus 220 includes demodulator 221, Reed-Solomon decoder 222, ATC to VT converter 223 of the present invention, and VT to DS-1 converter 224 in order to demodulate the RF transmission, decode the Reed-Solomon encoded ATCs, convert the ATCs to VT components and/or DS-1 packets for use by remote network node 202. Node conversion apparatus 220 also includes DS-1 to VT converter 225 and VT to ATC converter 226 of the present invention to accept the native data packets from remote network node 202 and convert the VT components and/or DS-1 packets to ATCs. Reed-Solomon encoder 227 and RF modulator (modulator) 228 are coupled to converter 226 in order to error correction encode the ATCs and to modulate the ATCs for airlink transmission via link 230.

In operation the preferred embodiment hub apparatus operates to demultiplex the OC-3 signal to the VT level before transporting it to a subscriber unit via the airlink. The DS-1 transport container on the network side of the hub is the VT. The transport container from/to the hub to/from the subscriber unit is a custom container, referred to herein as an ATC. A purpose of the ATC of the preferred embodiment of the present invention is to allow the system to transport multiple asynchronous payloads, here DS-1, on a synchronous air interface. Therefore, the system provides a pseudo VT1.5 transport, i.e., the ATC is designed to carry the DS-1 payload while maintaining the floating payload nature of he VT1.5. Accordingly, the VT path is broken, but the DS-1 payload remains floating. As such, the present invention operates to transport payloads which are functionally equivalent to those input while maintaining the identical payload to overhead relationship for every frame necessary for synchronous communication. Although all essential container overhead information is transmitted across the air link, the present invention minimizes additional bandwidth requirements for transmitting such overhead while maintaining functional transparency.

It should be appreciated that although a particular preferred embodiment of an ATC is described herein, transport of the synchronous data over an airlink according to the present invention may use any number of ATCs which are different than that described, including constant rate and burst mode solutions. The transport requires, however, transmission of a sufficient amount of data, including the intelligent compression of overhead, to synchronously transmit a particular payload. In the preferred embodiment, where VT superframe data is transmitted, the transport must communicate 98 bytes every 500 $\mu$s.

As discussed above with reference to FIG. 1, the VT pointer bytes are V1 through V4. V1 and V2 are the actual pointer and point to one of 104 offsets where the V5 byte can be found. There are 108 total byte locations within a VT superframe, but four of these locations are occupied by the pointer bytes V1 through V4. Accordingly there are 104 remaining locations for the VT payload envelope (which as described above includes the VT overhead bytes V5, J2, Z6, Z7, the Ca–Cd bytes, and four 192 bit packets of DS-1 data). The byte location immediately following V2 is identified as offset number 0 (shown in FIG. 1). The byte location next following V2 is offset number 1. The offset numbering continues until the byte location immediately preceding V2 is offset number 103 (shown in FIG. 1). For example, the V1 and V2 bytes of FIG. 1 would point to offset location 12 since the V5 byte is 13 byte locations after V2.

Also as discussed above, V3 is a negative stuff opportunity. When the DS-1 bit rate is faster than nominal, incoming data accumulates at the SONET network element faster than the SONET network can transport it. To allow SONET to "catch up" with the faster than nominal DS-1 bit rate, the V3 byte, normally carrying no data, can be made to carry a byte of payload. This effectively makes the payload capacity of the VT increase for one frame making use of a negative stuff from 24.125 bytes to 25.125 bytes.

Figure 3:
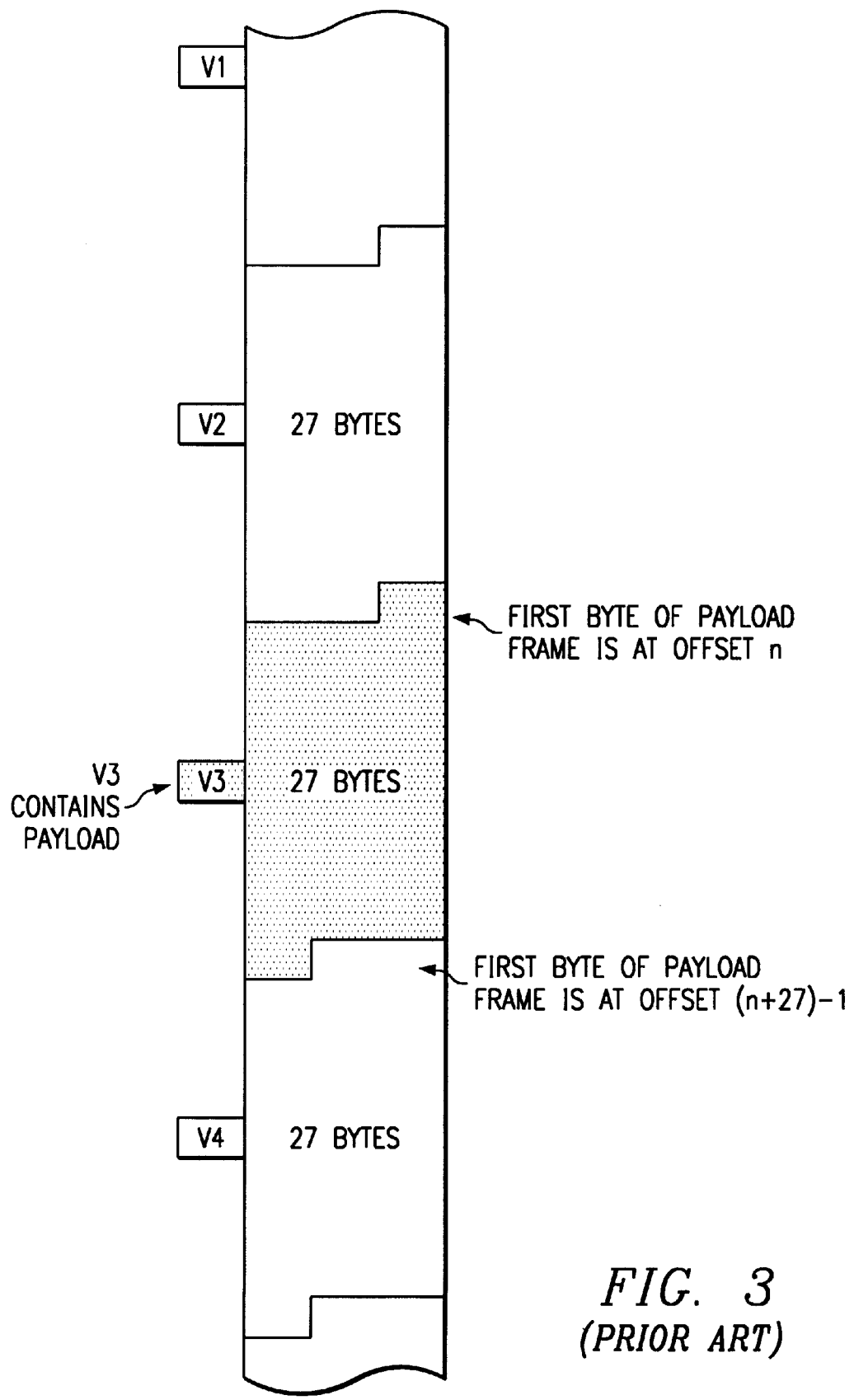
FIG. 3 shows a negative stuff operation in the prior art VT1.5 transport container of FIG. 1.

However, using V3 as a negative stuff byte causes the pointer offset, the V1 and V2 bytes, to be decremented in the next superframe because the payload has moved up in the VT superframe by one byte position due to the negative stuff. The use of the V3 byte in a negative stuff operation is shown in FIG. 3 wherein a particular payload byte is transported one byte earlier in the V3 byte position and, accordingly, all subsequent DS-1 data bytes follow suit. Therefore the V5 byte in the next superframe will be in a byte location that is one byte earlier than it would have been had the negative stuff operation not occurred. The V1 and V2 pointer bytes will be decremented to reflect this new location.

Contrariwise, when the DS-1 bit rate is below nominal, incoming data arrives at the SONET network element slower than the SONET network can transport it. To allow SONET to "slip" the slower than nominal DS-1 bit rate, a stuff byte may be inserted into the VT. The byte immediately following V3 is defined by SONET as a positive stuff opportunity. When utilized for stuffing operations, this byte should be discarded by the receiver.

Figure 4:
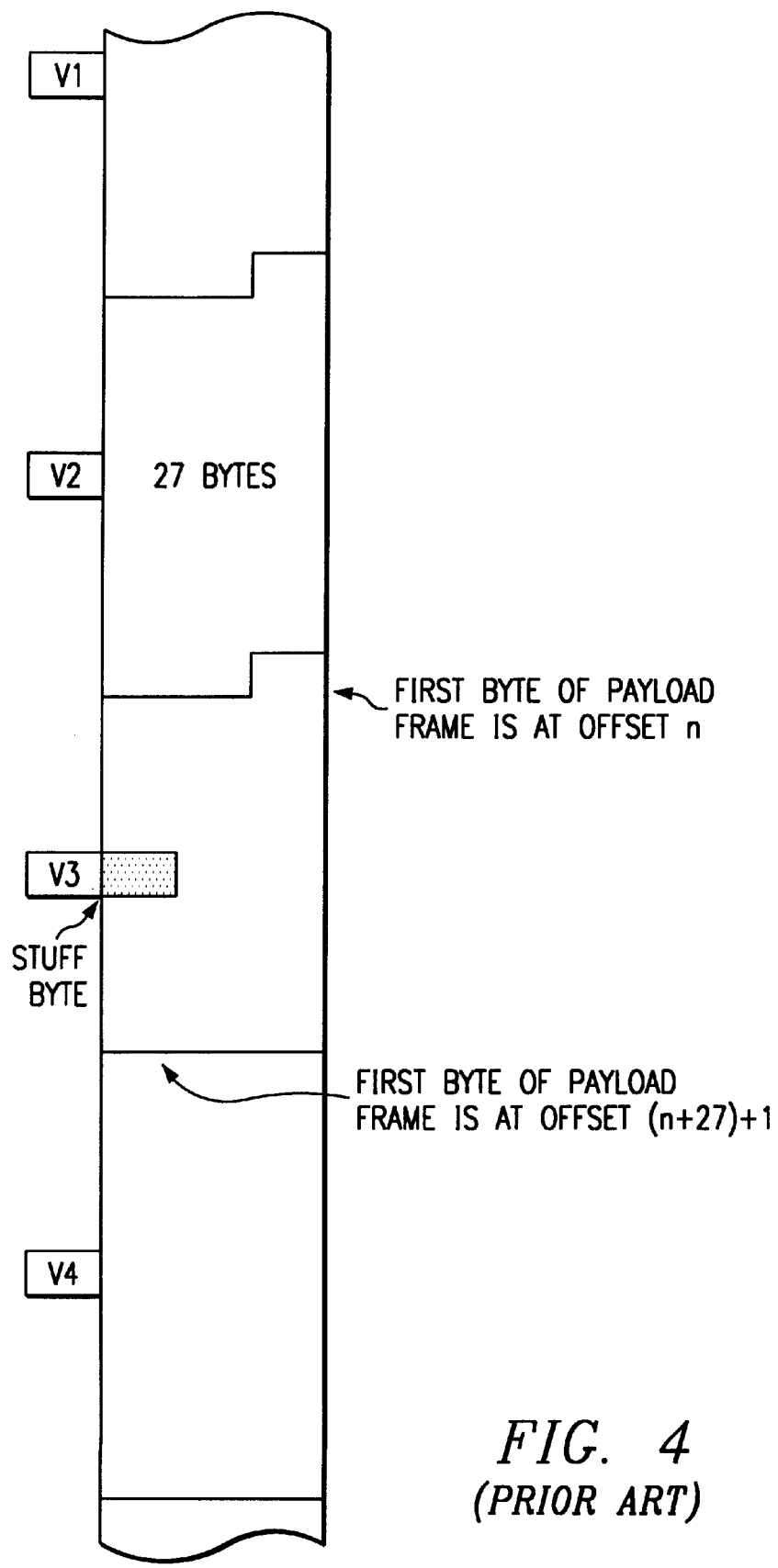
FIG. 4 shows a positive stuff operation in the prior art VT1.5 transport container of FIG. 1.

A positive stuff operation has the effect of causing the V1 and V2 pointer bytes to be incremented because the payload byte that would have occupied the location immediately following the V3 byte is now occupying the location two bytes from V3. The use of the byte following the V3 byte in a positive stuff operation is shown in FIG. 4 wherein a particular payload byte is transported one byte later in the byte position two bytes from V3 and, accordingly, all subsequent DS-1 data bytes follow suit. Therefore the V5 byte in the next superframe will be in a byte location that is one byte later than it would have been had the positive stuff operation not occurred. The V1 and V2 pointer bytes will be incremented to reflect this new location.

Figure 5:
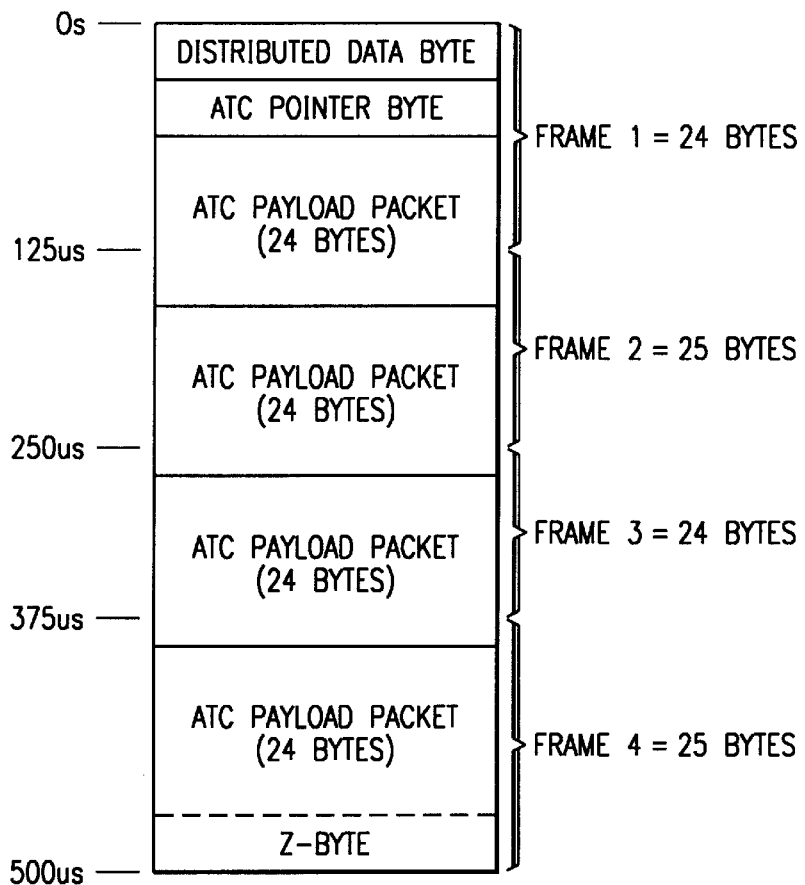
FIG. 5 shows a superframe of an airlink transport container according to a preferred embodiment of the present invention.

The ATC of the present invention is preferably adapted to accommodate the above described negative and positive stuff operations which result in a floating payload within the data packets transmitted. Accordingly, a preferred embodiment of the present invention utilizes a 500 μs, four frame, transport container as shown in FIG. 5. The container capacity of the ATC of the preferred embodiment is the equivalent of a VT1.5 superframe. Of course, the present invention is not limited to the ATC of the preferred embodiment and may, in fact, be adjusted to accommodate any of a number of data packets to be transmitted.

The first (frame 1) and third (frame 3) frames of the ATC superframe shown in FIG. 5 transport 24 bytes while the second (frame 2) and fourth (frame 4) frames transport 25 bytes. This is primarily to accommodate the use of an available Reed-Solomon error detection/correction algorithm as well as to provide a transport container matched to the actual payload to be carried. Specifically, the aforementioned use of Reed-Solomon encoding limits the number of DS-1 data bytes to no more than 393 bytes/2 ms due to the particular Reed-Solomon algorithm utilized according to a preferred embodiment. Each VT1.5 frame typically supplies 193 bits of DS-1 data, which is 24 bytes plus one bit. Over 16 frames (2 ms) this results in 386 bytes. However if the ATC frame size were to be rounded up to 25 bytes to transport 24.125 bytes per VT1.5 frame, 16 ATC frames would be 400 bytes. This is 7 bytes more than the Reed-Solomon error detection/correction algorithm of the preferred embodiment accepts. Alternatively, by moving the ⅛th byte from the ATC frames one and three to ATC frames two and four, respectively, and rounding only ATC frames two and four to 25 bytes, an ATC superframe is created that alternates 24 bytes, 25 bytes, 24 bytes, and 25 bytes. Sixteen of these frames results in 392 bytes which fits into the 393 byte Reed-Solomon limit of the preferred embodiment. Of course, as Reed-Solomon encoding algorithms are scalable, other ATC frame sizes may be utilized more efficiently with other such algorithms. Moreover, as there is no limitation to the present invention utilizing Reed-Solomon error detection/correction algorithms, alternative embodiments of the present invention may utilize ATC frame sizes selected without consideration of any Reed-Solomon algorithm constraints.

The 96 bytes of DS-1 payload carried by a VT1.5 superframe (four 192 bit packets) are carried in four 24 byte ATC payload packets as shown in FIG. 5. The $I_n$, $C_m$, and $S_m$ bits carried in the Ca–Cd bytes of the VT1.5 superframe are preferably carried in the distributed data byte (DDB) of the ATC superframe. The VT1.5 to ATC algorithm strips off unused bits from the Ca–Cd bytes (indicated in the discussion above as bits "R" and "O"). The VT1.5 to ATC algorithm also preferably performs stuff control voting of the $C1_1$, $C1_2$, $C1_3$, $C2_1$, $C2_2$, and $C2_3$ bits as described in more detail below, thus only passing one pair of stuff control bits in the ATC DDB.

Because the two ⅛th bytes in ATC frames one and three are displaced from their original positions in the data stream, a downstream ATC to VT1.5 converter will need to know where they belong to reassemble the data stream. Therefore, the ATC of the preferred embodiment makes use of a pointer, the ATC pointer byte, to track the location in the VT1.5 superframe where the Ca–Cd bytes should be inserted in the VT1.5 superframe by the ATC to VT1.5 conversion algorithm.

As shown in FIG. 5, a DDB is preferably the first byte of the ATC superframe and the ATC pointer byte is preferably the second byte of the ATC superframe. The positioning of the DDB and the ATC pointer byte at the beginning of the first frame of an ATC superframe is preferred as the downstream ATC to VT1.5 converter can begin re-assembling VT1.5s during the first received frame, thereby reducing latencies associated with the use of the present invention.

Figure 6:
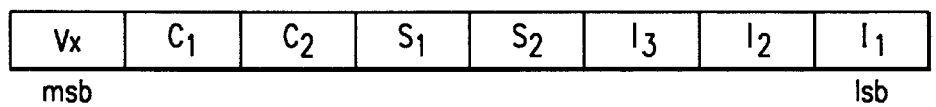
FIG. 6 shows a bit mapping of the distributed data byte of the airlink transport container of FIG. 5.

Preferably, the DDB contains three payload bits ($I_1$, $I_2$, and $I_3$), two stuff control bits ($C_1$ and $C_2$), two stuff opportunity bits ($S_1$ and $S_2$), and one bit that is used to indicate to the ATC to VT1.5 converter that a negative stuff has occurred (Vx). The preferred format of the DDB is shown in FIG. 6.

The $I_1$–$I_3$ bit positions are DS-1 payload bits that provide the VT1.5 and ATC transports with the ability to carry 193 bits per 125 μs. VX=0 when a negative stuff has occurred and there is payload in the ATC pointer byte. When Vx=1 the ATC pointer byte contains pointer and phase indicators.

$S_1$ and $S_2$ are the stuff opportunity bits of the present invention. $C_1$ and $C_2$ are the stuff control bits. For example, when $C_1$=0, $S_1$ contains a payload bit, and when $C_1$=1, $S_1$ is a stuff bit. Likewise, when $C_2$=0, $S_2$ contains a payload bit, and when $C_2$=1, $S_2$ is a stuff bit. Accordingly, when the DS-1 data rate is nominal $S_1$ will carry a DS-1 payload bit and $S_2$ will be a stuff bit in order to match the 193 bits/frame DS-1 rate. However, if the incoming DS-1 bit rate is slower than nominal, $S_1$ and $S_2$ will both be stuff bits. Similarly, if the incoming DS-1 bit rate is faster than nominal, both $S_1$ and $S_2$ will carry DS-1 payload bits.

An ATC pointer byte is primarily to track the location within each ATC frame where the Ca–Cd bytes belong in the VT1.5 superframe. The pointer byte, as discussed above, is also preferably used to transport a byte of payload when a VT1.5 negative stuff has occurred.

The preferred embodiment of the present invention utilizes a pointer byte because an OC-3 delivers eighty-four VT1.5s one frame at a time wherein the individual payloads may have a velocity with respect to not only the SONET transport, but also with respect to each other. Accordingly, all eighty-four payload envelopes will not likely be aligned, i.e., the V5 bytes will not all be in the same location in the VT1.5s of an OC-3. Therefore, the preferred embodiment utilizes a pointer byte in order to properly reassemble the data of the VTs from the ATCs.

It shall be appreciated that the pointer byte of the preferred embodiment of the present invention is suitable for use both for locating the Ca–Cd bytes in the VT1.5 superframe as well as to carry payload associated with a VT1.5 negative stuff operation. The ATC pointer byte is suitable for use in carrying negative stuff payload according to the present invention because SONET establishes that negative stuffs can occur no more frequently than once per four superframes. Therefore, in the worst case scenario, an ATC receiver will receive three successive valid pointers before receiving an ATC superframe with payload in the pointer byte location. Accordingly, the preferred embodiment operates the receiver in pointer holdover mode, relying on the previous superframe's pointer value, when payload is transported in the pointer byte location.

Figure 7:
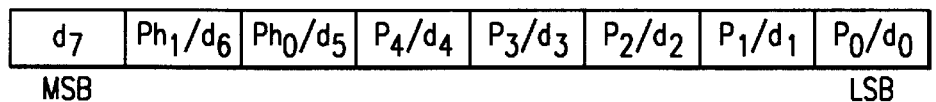
FIG. 7 shows a bit mapping of the pointer byte of the airlink transport container of FIG. 5.

Preferably, the pointer byte is formatted as shown in FIG. 7. Bits $P_4$–$P_0$ of the pointer byte point to one of twenty-six offsets within a VT1.5 framework where one of the Ca–Cd bytes should be inserted by the ATC to VT1.5 algorithm, i.e., because the Ca–Cd bytes are evenly distributed throughout the VT1.5 payload, one of the Ca–Cd bytes must fall within the first twenty-six offsets of the VT1.5.

Figure 8:
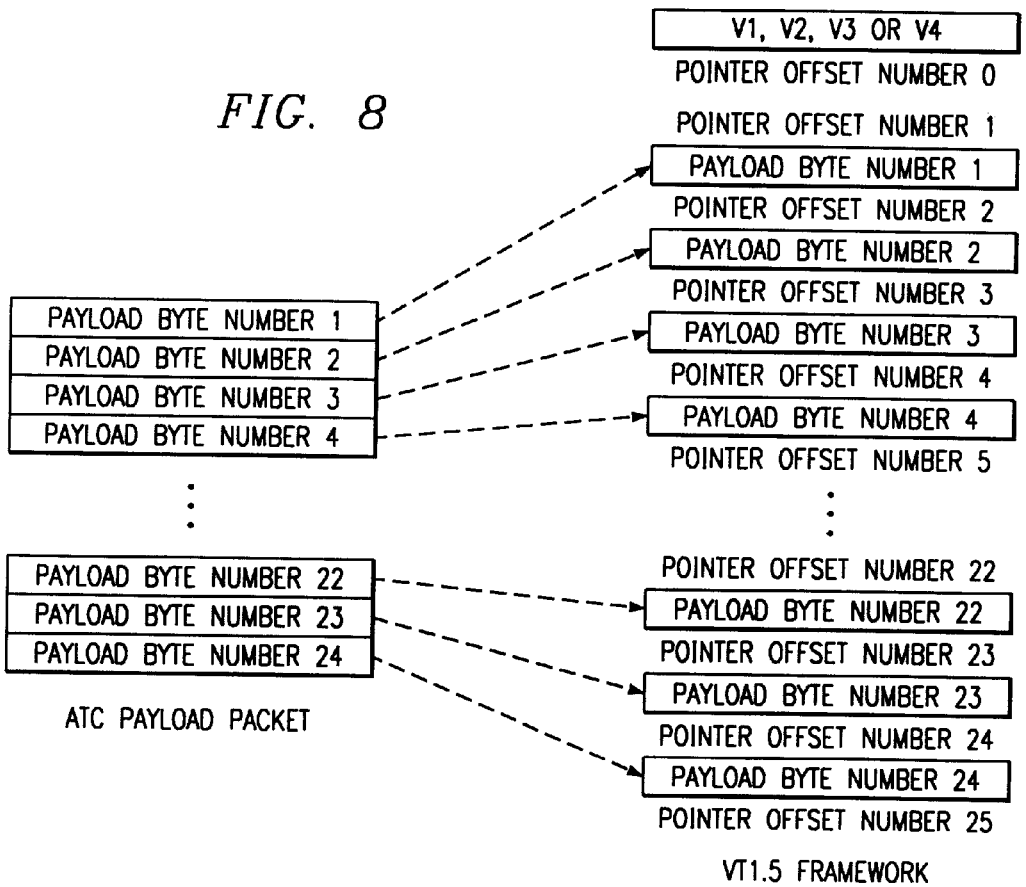
FIG. 8 shows the offset positions associated with the pointer byte of FIG. 7.

FIG. 8 illustrates the relationship of the offset positions to the VT1.5 framework. It should be appreciated that there are preferably two offset positions between the VT pointer byte, V1–V4, and the beginning of the payload bytes in order to indicate the placement of the VT path overhead byte associated with the Ca–Cd byte being positioned. Accordingly, when $P_4$–$P_0$ point to offset one, the Ca–Cd byte should be placed in offset position one and the appropriate associated VT path overhead byte (V5, J2, Z6, or Z7) should be placed in offset position zero. However, when $P_4$–$P_0$ point to offset zero, the Ca–Cd byte should be placed in offset position zero, and the appropriate associated VT path overhead byte should be placed in the last position of the previous VT1.5 frame. In either case, the first payload byte immediately follows the Ca–Cd byte. When $P_4$–$P_0$ point to offset locations 2 through 25, the appropriate associated VT path overhead byte and corresponding Ca–Cd byte should be inserted between bytes of the twenty-four ATC payload packet as indicated in FIG. 8. $Ph_1$–$Ph_0$ of the ATC pointer byte are preferably phase indicators. Accordingly, the phase field of the pointer byte may be utilized to tell an ATC to VT1.5 converter which byte of the Ca, Cb, Cc, or Cd bytes to insert in which frame of a VT1.5 superframe.

By using phase information in combination with the above described pointers, the present invention is provided with 128 unique values sufficient to encompass the 104 range required to indicate the placement of data within the VT1.5 superframe. The phase information is preferably as shown in the table below.

| Phase | V1 Frame | V2 Frame | V3 Frame | V4 Frame |
|-------|----------|----------|----------|----------|
| 00    | Ca       | Cb       | Cc       | Cd       |
| 01    | Cd       | Ca       | Cb       | Cc       |
| 10    | Cc       | Cd       | Ca       | Cb       |
| 11    | Cb       | Cc       | Cd       | Ca       |

The phase indicator, $Ph_1$–$Ph_0$, also preferably communicates information as to how the ATC to VT1.5 algorithm should rebuild the Ca–Cd bytes. Because the ATC superframe of the preferred embodiment uses only 98 bytes to transport the 108 byte VT1.5 superframe, the information in the Ca–Cd bytes is condensed before being transported by the ATC superframe.

For example, the VT1.5 superframe includes three pairs of the stuff control bits, C1 and C2, in the Ca–Cd bytes (specifically there is one pair in each of the Cb, Cc, and Cd bytes). This feature of the SONET VT1.5 allows an add/drop multiplexer to perform polling of these bits, thus reducing single bit errors. However, the preferred embodiment of the present invention condenses the information in the Ca–Cd bytes by allowing the VT1.5 to ATC converter to perform the polling and transport only one pair of C1 and C2 bits.

The above described preferred embodiment of the present invention, utilizing the polling function of the three pairs of the stuff control bits and the ATC allowing its payload to float (phase vary), requires the VT1.5 to ATC converter to "look ahead" another three frames from a frame containing a first Ca–Cd byte in order for the VT1.5 to ATC algorithm to be assured of collecting the appropriate stuff control bits for a 500 $\mu$s superframe. Accordingly, the VT1.5 to ATC algorithm of the preferred embodiment collects six VT1.5 frames of input data to be assured of collecting all three sets of associated C1 and C2 bits.

Figure 9A:
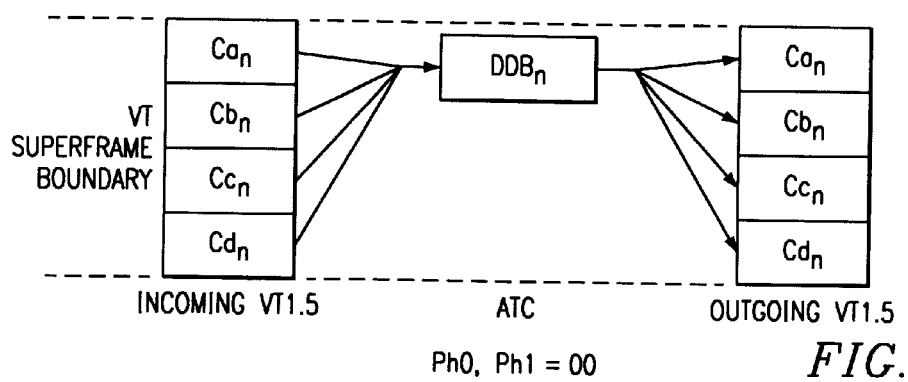
FIGS. 9A through 9D show the relationship of the phase of the airlink transport container of the preferred embodiment and the content of the distributed data byte of the preferred embodiment.
Figure 9B:
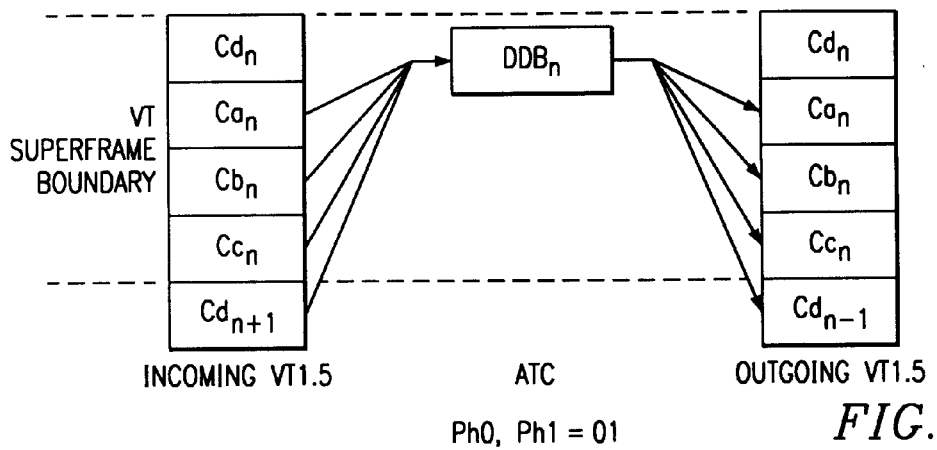
Figure 9C:
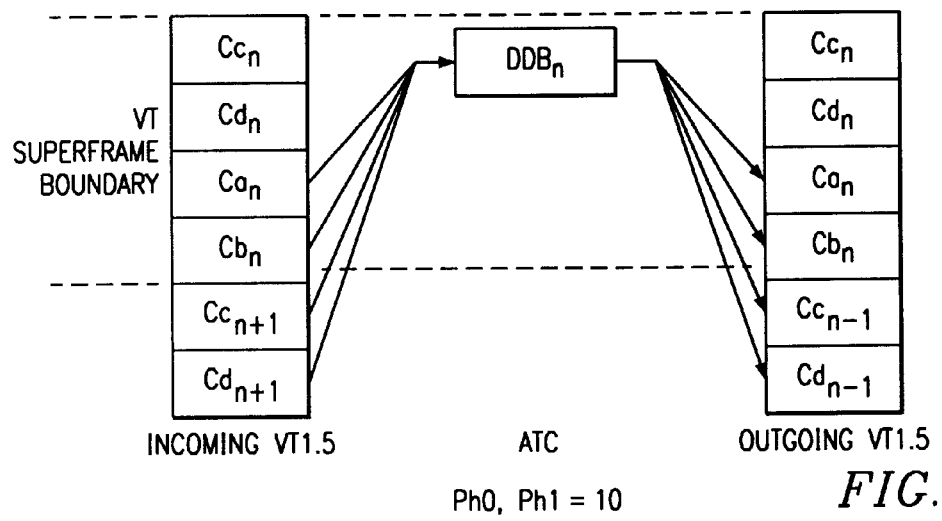
Figure 9D:
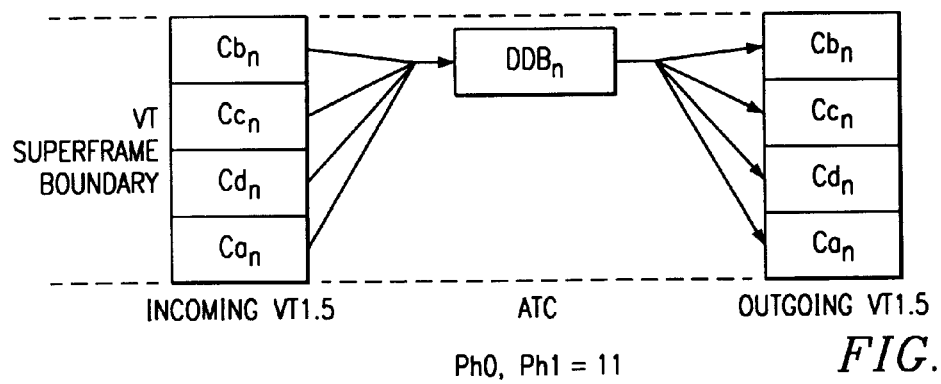

Directing attention to FIGS. 9A through 9D, the collection of VT1.5 frames of input data for the condensation of three sets of associated C1 and C2 bits to build a DDB according to the preferred embodiment is shown. As shown in FIG. 9A, the associated Ca–Cd bytes are all provided in the incoming VT1.5 superframe. Accordingly, looking ahead three frames from the Ca byte to build the DDB does not require frames beyond the VT1.5 superframe. However, as shown in FIG. 9B, the Ca byte is in the second frame of the VT1.5 superframe. Therefore, looking ahead three frames requires collecting a frame from the subsequent VT1.5 superframe (requiring collection of a total of five frames). Similarly, as shown in FIG. 9C, the Ca byte is in the third frame of the VT1.5 superframe. Therefore, looking ahead three frames requires collecting two frames from the subsequent VT1.5 superframe (requiring collection of a total of six frames).

Continuing the above pattern of frame collection, it would at first appear that collection of a total of seven frames would be required in order to condense the information of the Ca–Cd bytes according to the preferred embodiment of the present invention. However, directing attention to FIG. 9D, it can be seen that where the Ca byte is in the fourth frame, the present invention does not look ahead to the subsequent VT1.5 superframe at all in order to build the DDB. This is because the Ca byte does not include any stuff control bits and, therefore, a Ca byte actually associated with subsequent Cb–Cd bytes may be condensed in a DDB according to the present invention.

The table below shows possible cases for the four phases of the preferred embodiment where n references the current superframe being processed, n−1 references the superframe prior to the current superframe, and n+1 references the superframe after the current superframe.

Specifically, the four columns under "VT1.5 Frame" in the table below are, from the perspective of the VT1.5 ultimately resulting from the ATC to VT converter of the present invention. The subscripts identify from which ATC superframe and, from which byte of that superframe (n=DDB, p=pointer byte) the information to rebuild the Ca–Cd bytes came. For example, with $Ca_{n-1}$, the n−1 subscript indicates the I1 bit used to build the outgoing Ca byte was received in DDB ("n" as opposed to "p") of the previous (n−1) ATC superframe, and with $Ca_p$, the p subscript indicates the I1 bit used to build the outgoing Ca byte was received in the pointer byte of the current ATC superframe. However, the eight columns under "DDBn" in the table below are from the perspective of the ATC superframe of the present invention. The subscripts in this case indicate from which incoming VT1.5 superframe, i.e., the VT1.5 superframe provided to the VT to ATC converter of the present invention, the bits in the DDB of the current ATC superframe should come.

For example, where Vx is 1, C1 is n+1, C2 is n+1, S1 is n+1, S2 is n+1, I3 is n, I2 is n, and I1 is n in the table below, n+1 subscript for C1, C2, S1 and S2 indicate the VT to ATC converter used it's "look-ahead" feature to collect this information from the Cd byte of the next VT superframe. The n subscript for I3, I2 and I1 indicate this information was collected from the Cc, Cb and Ca bytes, respectively of the current VT superframe.

The appearance of an X in a cell of the table below represents a "don't care" condition with respect to that particular element. The appearance of an asterisk (*) next to an entry in a cell of the table below represents a logical inversion or complement of the element.

The following description of the formatting of data on the above table is offered to aid in interpreting the information presented. The rows of the table are organized as an ordered sequence of superframes (although not necessarily consecutive superframes). For example, sequence number 1a illustrates a phase=00, pointer=any, no-stuff superframe. Sequence 1x (where x represents any of groupings a, b, c, d, e, f, g and j) for all four phases provides a baseline of reference for understanding the more complicated sequences in Sequence numbers 2x and 3x.

Continuing the explanation of the a sequences grouping, sequence number 2a is a phase=00, non-boundary positive stuff superframe. This is the simplest of the two types of positive stuff events. Sequence number 3a illustrates a phase=00, boundary positive stuff superframe. This is the more complicated and less frequent of the two types if positive stuff events. Sequence number 4a illustrates the incremented phase field and re-initialized pointer field that occurs as a result of the boundary positive stuff event in the previous superframe (depicted in sequence number 3a).

It should be appreciated that the grouping pattern of 1x normal position, 2x basic stuff operation, 3x boundary stuff operation, and 4x superframe following boundary stuff operation is a realistic sequence of events illustrating the

| Seq. No.[1] | Phase | ATC Pointer | | Stuff | VT1.5 Frame | | | | $DDB_n$ | | | | | | | |
|---|---|---|---|---|---|---|---|---|---|---|---|---|---|---|---|---|
| | n | n | n−1 | n | 1 | 2 | 3 | 4 | Vx | C1 | C2 | S1 | S2 | I3 | I2 | I1 |
| 1a | 00 | X | X | none | $Ca_n$ | $Cb_n$ | $Cc_n$ | $Cd_n$ | 1 | n | n | n | n | n | n | n |
| 2a | 00 | $*P_{n-1}$ | ≠25 | Pos | $Ca_n$ | $Cb_n$ | $Cc_n$ | $Cd_n$ | 1 | n | n | n | n | n | n | n |
| 3a | 00 | *25 | =25 | Pos | $Ca_n$ | $Cb_n$ | note[2] | $Cc_n$ | 1 | n+1 | n+1 | n+1 | n+1 | n | n | n |
| 4a | 01 | 0 | *25 | none | $Cd_{n-1}$ | $Ca_n$ | $Cb_n$ | $Cc_n$ | 1 | n+1 | n+1 | n+1 | n+1 | n | n | n |
| 1b | 00 | X | X | none | $Ca_n$ | $Cb_n$ | $Cc_n$ | $Cd_n$ | 1 | n | n | n | n | n | n | n |
| 2b | 00 | data[3] | ≠0 | Neg | $Ca_n$ | $Cb_n$ | $Cc_n$ | $Cd_n$ | 0 | n | n | n | n | n | n | n |
| 3b | 00 | data[4] | 0 | Neg | $Ca_n$ | $Cb_n$ | $Cc_n/Cd_n$ | $Ca_p$[6] | 0 | n | n | n | n | n | n | n |
| 4b | 11 | 25 | 0 | none | $Cb_n$ | $Cc_n$ | $Cd_n$ | $Ca_n$ | 1 | n | n | n | n | n | n | n |
| 1c | 01 | X | X | none | $Cd_{n-1}$ | $Ca_n$ | $Cb_n$ | $Cc_n$ | 1 | n+1 | n+1 | n+1 | n+1 | n | n | n |
| 2c | 01 | $*P_{n-1}$ | ≠25 | Pos | $Cd_{n-1}$ | $Ca_n$ | $Cb_n$ | $Cc_n$ | 1 | n+1 | n+1 | n+1 | n+1 | n | n | n |
| 3c | 01 | *25 | 25 | Pos | $Cd_{n-1}$ | $Ca_n$ | note[2] | $Cb_n$ | 1 | n+1 | n+1 | n+1 | n+1 | n+1 | n | n |
| 4c | 10 | 0 | *25 | none | $Cc_{n-1}$ | $Cd_{n-1}$ | $Ca_n$ | $Cb_n$ | 1 | n+1 | n+1 | n+1 | n+1 | n+1 | n | n |
| 1d | 01 | X | X | none | $Cd_{n-1}$ | $Ca_n$ | $Cb_n$ | $Cc_n$ | 1 | n+1 | n+1 | n+1 | n+1 | n | n | n |
| 2d | 01 | data[3] | ≠0 | Neg | $Cd_{n-1}$ | $Ca_n$ | $Cb_n$ | $Cc_n$ | 0 | n+1 | n+1 | n+1 | n+1 | n | n | n |
| 3d | 01 | 0 | 0 | Neg | $Cd_{n-1}$ | $Ca_n$ | $Cb_n/Cc_n$ | $Cd_n$ | 0 | n | n | n | n | n | n | n |
| 4d | 00 | 25 | 0 | none | $Ca_n$ | $Cb_n$ | $Cc_n$ | $Cd_n$ | 1 | n | n | n | n | n | n | n |
| 1e | 10 | X | X | none | $Cc_{n-1}$ | $Cd_{n-1}$ | $Ca_n$ | $Cb_n$ | 1 | n+1 | n+1 | n+1 | n+1 | n+1 | n | n |
| 2e | 10 | $*P_{n-1}$ | ≠25 | Pos | $Cc_{n-1}$ | $Cd_{n-1}$ | $Ca_n$ | $Cb_n$ | 1 | n+1 | n+1 | n+1 | n+1 | n+1 | n | n |
| 3e | 10 | *25 | =25 | Pos | $Cc_{n-1}$ | $Cd_{n-1}$ | note[2] | $Ca_n$ | 1 | R | R | R | R | R | R | n |
| 4e | 11 | 0 | *25 | none | $Cb_n$ | $Cc_n$ | $Cd_n$ | $Ca_n$ | 1 | n | n | n | n | n | n | n |
| 1f | 10 | X | X | none | $Cc_{n-1}$ | $Cd_{n-1}$ | $Ca_n$ | $Cb_n$ | 1 | n+1 | n+1 | n+1 | n+1 | n+1 | n | n |
| 2f | 10 | data[3] | ≠0 | Neg | $Cc_{n-1}$ | $Cd_{n-1}$ | $Ca_n$ | $Cb_n$ | 0 | n+1 | n+1 | n+1 | n+1 | n+1 | n | n |
| 3f | 10 | 0 | 0 | Neg | $Cc_{n-1}$ | $Cd_{n-1}$ | $Ca_n/Cb_n$ | $Cc_n$ | 0 | n+1 | n+1 | n+1 | n+1 | n | n | n |
| 4f | 01 | 25 | 0 | none | $Cd_{n-1}$ | $Cc_n$ | $Cb_n$ | $Cc_n$ | 1 | n+1 | n+1 | n+1 | n+1 | n | n | n |
| 1g | 11 | X | X | none | $Cb_n$ | $Cc_n$ | $Cd_n$ | $Ca_n$ | 1 | n | n | n | n | n | n | n |
| 2g | 11 | $*P_{n-1}$ | ≠25 | Pos | $Cb_n$ | $Cc_n$ | $Cd_n$ | $Ca_n$ | 1 | n | n | n | n | n | n | n |
| 3g | 11 | *25 | 25 | Pos | $Cb_n$ | $Cc_n$ | note[2] | $Cd_n$ | 1 | n | n | n | n | n | n | R |
| 4g | 00 | 0 | *25 | none | $Ca_n$ | $Cb_n$ | $Cc_n$ | $Cd_n$ | 1 | n | n | n | n | n | n | n |
| 1j | 11 | X | X | none | $Cb_n$ | $Cc_n$ | $Cd_n$ | $Ca_n$ | 1 | n | n | n | n | n | n | n |
| 2j | 11 | data[3] | ≠0 | Neg | $Cb_n$ | $Cc_n$ | $Cd_n$ | $Ca_n$ | 0 | n | n | n | n | n | n | n |
| 3j | 11 | data[5] | 0 | Neg | $Cb_n$ | $Cc_n$ | $Cd_n/Ca_n$ | $Cb_p$ | 0 | n | n | n | n | n | n | n |
| 4j | 10 | 25 | 0 | none | $Cc_{p-1}$[5] | $Cd_{p-1}$ | $Ca_n$ | $Cb_n$ | 1 | n+1 | n+1 | n+1 | n+1 | n+1 | n | n |
| 5j | 10 | 25 | 25 | none | $Cc_{n-1}$ | $Cd_{n-1}$ | $Ca_n$ | $Cb_n$ | 1 | n+1 | n+1 | n+1 | n+1 | n+1 | n | n |

[1]"Sequence Number" is a substantially arbitrary nomenclature provided for simplified reference to superframe events in the table.
[2]The Cx byte normally in this position has been pushed into the next superframe as a result of the positive stuff event.
[3]When a non-boundary, negative stuff occurs, the ATC pointer will contain a byte of payload.
[4]When a negative boundary stuff occurs with the phase equal to 00, the pointer field contains a partial DDB. The format of the pointer field in this case is: R, R, R, R, R, R, R, $I_1$.
[5]When a boundary negative stuff occurs with the phase equal to 11, the pointer byte carries a partial DDB. The format of the pointer byte in this case is R, $C1_{p-1}$, $C2_{p-1}$, $S1_{p-1}$, $I3_{p-1}$, $I2_{p-1}$, R.
[6]A subscript of "p" means that data was transported in the ATC pointer byte.

ATC pointer incrementing/decrementing as a result of positive/negative stuffs until a boundary is reached which may be experienced in operation. Accordingly, the above table is not offered as a list of all possible scenarios, but as an ordered sequence of events that will aid in understanding the present invention.

As shown above, the possible cases for each phase include no occurrence of a stuff, a positive stuff, including a non-boundary stuff and a boundary stuff, and a negative stuff, including a non-boundary stuff and a boundary stuff. These events are discussed in further detail below.

As previously described, a positive stuff causes the VT pointer to be incremented. A positive stuff also causes the ATC pointer to be incremented and, for the same reason, the beginning of the payload envelope is advanced by one offset.

When a positive stuff occurs, a stuff byte is inserted in the VT1.5 in the first byte position after V3 as shown in FIG. 1. The ATC of the preferred embodiment responds to a positive stuff in the VT1.5 by adding a stuff byte to the last byte position in the ATC superframe. This byte position is shown as the Z byte position in FIG. 5.

In the preferred embodiment the bits in the pointer field of the ATC pointer byte will be complemented to indicate to the ATC to VT1.5 converter that a positive stuff has occurred and that the last byte of the superframe is a stuff byte which should be discarded. The use of a complemented pointer for a positive stuff operation is shown in the table above at sequence numbers 2a, 3a, 2c, 3c, 2e, 3e, 2g, and 3g.

It shall be appreciated that the value contained in the pointer field of the pointer byte in a non-boundary, positive stuff superframe will be the same value contained in the previous superframe, except that it will be complemented, because SONET guarantees a stuff operation will occur no more frequently than once per four superframes, i.e., a stuff operation could not have occurred in the previous superframe. Accordingly the preferred embodiment ATC to VT1.5 algorithm complements the previous pointer value and compares it to the current (complemented as transmitted) pointer value to verify the positive stuff indication. The ATC pointer will be incremented and uncomplemented in the next superframe to reflect the beginning of the payload envelope advancing by one offset.

As the preferred embodiment of the present invention does not operate to transport the VT path overhead bytes V5, J2, Z6, and Z7, there is a special case which exists when there is an occurrence of a positive stuff and the ATC pointer points to zero offset. When a VT1.5 pointer contains a value of 25, 51, 77, or 103, all corresponding to an ATC pointer value of zero, and a positive stuff occurs, the byte at the end of the current VT superframe that is pushed into the next superframe is a VT path overhead byte (V5, J2, Z6, or Z7). However, since these bytes are not carried in the preferred embodiment ATC superframe, the effective payload as experienced by the ATC superframe does not decrease as is the case in a normal positive stuff event. Accordingly, when the ATC pointer is set to an offset of zero and a positive stuff occurs, the Z byte of the preferred embodiment will contain payload rather than a stuff byte.

Another special case exists when the VT1.5 pointer points to offset locations 24, 50, 76, or 102, all corresponding to an ATC pointer value of 25, and a positive stuff occurs (boundary positive stuff . In this case the byte at the end of the current VT superframe that is pushed into the next superframe is a Ca, Cb, Cc, or Cd byte. This results in the VT1.5 superframe containing only three of the four Ca–Cd bytes.

Figure 10:
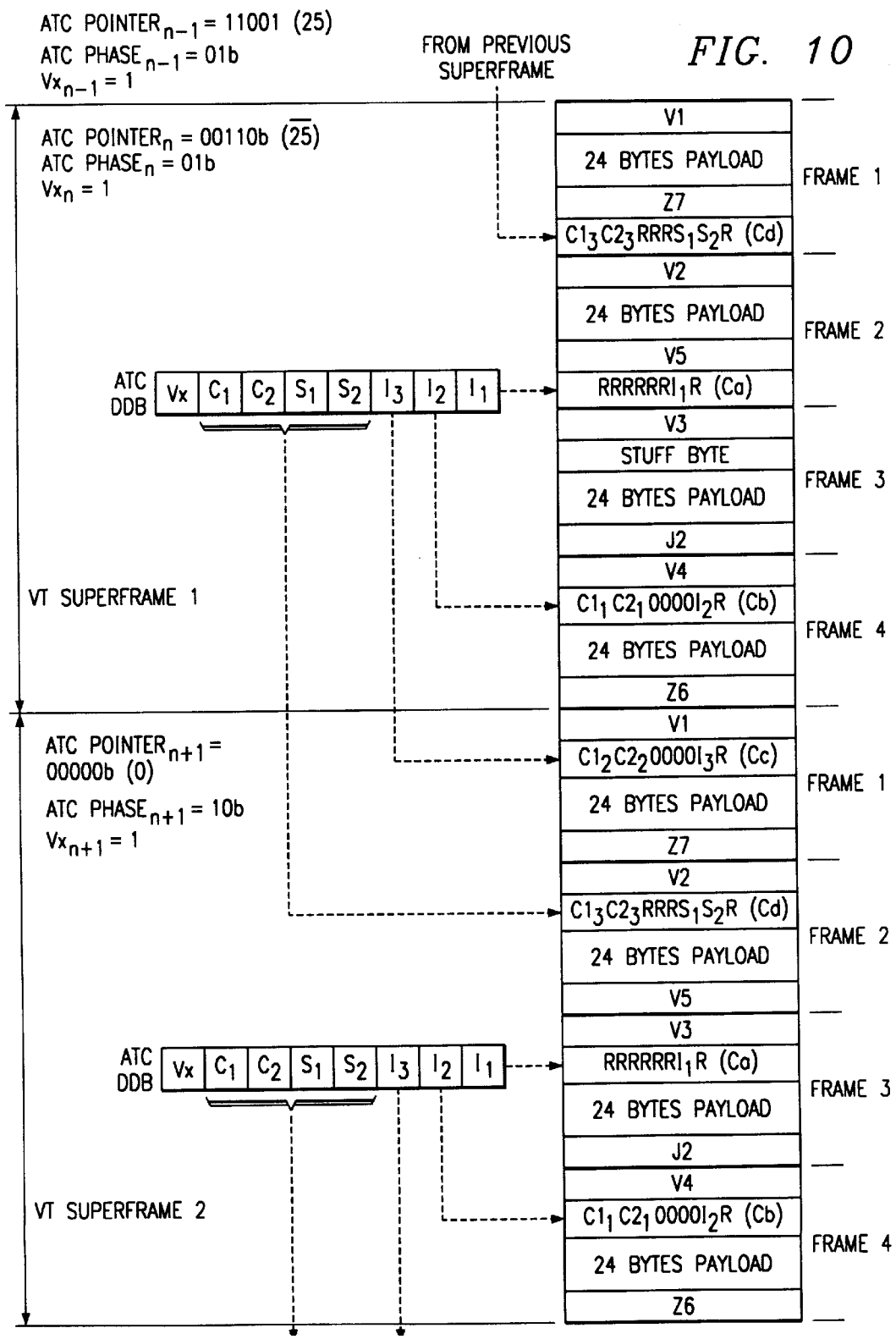
FIG. 10 shows the content of the distributed data byte of the preferred embodiment upon the occurrence of a special case positive stuff event.

A two frame sequence of VT frames is shown in FIG. 10 wherein the VT1.5 pointer points to offset location 25 and a positive stuff occurs. The first VT superframe of FIG. 10, superframe1, represents the case set forth at sequence number 3c of the table above. The second VT superframe of FIG. 10, superframe 2, represents the case set forth at sequence number 4c of the table above. It should be appreciated that the ATC pointer of superframe1 is complemented to indicate a positive stuff operation and that the phase indicator is incremented in superframe2.

As previously described, a negative stuff allows one VT frame to transport an extra byte of payload and, thus, causes the VT pointer to be decremented. However, as discussed above, the extra byte of payload associated with a negative stuff event is transported in the preferred embodiment of the present invention in the ATC pointer byte. Accordingly the VT1.5 to ATC converter places the payload byte carried in the V3 byte of the VT1.5 superframe in the ATC pointer byte and the ATC to VT1.5 converter inserts the payload from the ATC pointer byte in the V3 byte position of the reassembled VT1.5 superframe. The negative stuff event is preferably indicated in the ATC superframe by setting the Vx bit in the ATC DDB as described above. The use of the Vx bit to indicate a negative stuff operation is shown in the table above at sequence numbers 2b, 3b, 2d, 3d, 2f, 3f, 2j, and 3j.

A negative stuff event also causes the ATC pointer of the subsequent ATC superframe to be decremented and, for the same reason, the beginning of the payload envelope of this subsequent ATC superframe to be advanced by one offset. Moreover, it should be appreciated that, although the extra payload associated with the negative stuff event is transported in the ATC pointer byte location, the current (stun ATC superframe includes pointer adjustment associated with the stuff event in the middle of the current ATC superframe. This is because stuff events begin around V3 which is in the middle of the superframe. It is the function of the pointer byte to identify the location of the Cx bytes, and the two Cx bytes that follow V3 are one pointer offset from the location of the Cx preceding V3.

As the preferred embodiment of the present invention operates to compress and transport the Ca–Cd bytes in the DDB, there are special cases which exist when there is an occurrence of a negative stuff and the ATC pointer points to zero offset (boundary negative stuff). In the VT1.5 superframe, the byte that is popped from the subsequent superframe into the current superframe in a boundary negative stuff is a Ca–Cd byte. Specifically, when a boundary negative stuff occurs and the ATC phase is: 0, the popped byte is the $Ca_{n+1}$, byte; 1, the popped byte is the $Cd_{n+1}$, byte; 2, the popped byte is $Cc_n$, and 3, the popped byte is $Cb_{n+1}$ (where n is the current ATC superframe and n+1 is the subsequent ATC superframe).

However, as the ATC of the present invention "looks ahead" as discussed above to transport associated Ca–Cd bytes compressed in the DDB, there is no need to include the popped Ca–Cd byte in the ATC pointer byte in all cases. Specifically, when there is a boundary negative stuff event and the ATC phase is either 1 or 2, the DDB of the current ATC already includes the Cx byte which is popped in the VT1.5 superframe. Accordingly, for these two specific cases (boundary negative stuff with ATC phase equal to 1 or 2) the ATC superframe transports the entire VT1.5 superframe without transporting payload in the ATC pointer byte. Instead, the ATC pointer byte will contain valid phase and pointer fields. Occurrences of these two special cases are shown at sequence numbers 3d, 4d, 3f and 4f. However, the phase of the next ATC superframe will be decremented, indicating a new distribution of the bits from the DDB, and the pointer byte will roll back to a value of 25.

In contrast, where a boundary negative stuff occurs (there is an occurrence of a negative stuff and the ATC pointer points to zero offset) and the ATC phase is either 0 or 3, the preferred embodiment of the ATC carries payload in the ATC pointer byte. This is because the popped Cx byte is not associated with the Ca–Cd bytes transported by the DDB and the phase of the current superframe (superframe n) which experienced the boundary negative stuff event transitions from phase 0 to phase 3, or from phase 3 to phase 2, in the subsequent superframe (superframe n+1). As shown at sequence numbers 3$b$ (superframe n, phase 0), 4$b$ (superframe n+1, phase 3), 3$j$ (superframe n, phase 3), and 4$j$ (superframe n+1, phase 2) of the table above, the distributed data bytes in the superframes of superframe n+1 in both of these cases would need to transport distributed data for both ATC superframes (either 9 or 14 bits in an 8 bit container) if the ATC pointer byte were not used to transport payload.

In a boundary negative stuff superframe with a phase of 0, the ATC pointer byte will preferably act as a second, partial, DDB, transporting R,R,R,R,R,R,R,I1$_p$, thus transporting the information bite of the Ca$_{n+1}$, byte which has been popped into the VT1.5 superframe. The DDB in this ATC superframe will carry C1$_n$, C2$_n$, S1$_n$, S2$_n$, I3$_n$, I2$_n$, and I1$_n$) thus transporting the, stuff control bits, stuff opportunity bits, and information bits of Ca$_n$, Cb$_n$, Cc$_n$, and Cd$_n$. The phase of the next ATC superframe will roll back to a value of 3, indicating a new distribution of the bits from the DDB. Additionally, the ATC pointer byte will roll back to a value of 25.

In a boundary negative stuff superframe with a phase of 3, the ATC pointer byte will preferably transport a second, partial, DDB, transporting I2$_p$ from the Cb$_n$, byte that popped into the current superframe, as well as I3$_{p-1}$ from the Cc$_{n+1}$, byte of the next superframe and C1$_{p-1}$, C2$_{p-1}$, S1$_{p-1}$, and S2$_{p-1}$ from the Cd$_{n+1}$ byte of the next superframe. It should be appreciated that the value of the C1$_{p-1}$ and C2$_{p-1}$ bits result from polling the three sets C1 and C2 bits carried in Cb$_n$, Cc$_{n+1}$, and Cd$_{n+1}$, as described above. The DDB in this ATC superframe will carry C1$_n$, C2$_n$, S1$_n$, S2$_n$, I3$_n$, I2$_n$, and I1$_n$, thus transporting the stuff control bits, stuff opportunity bits, and information bits of Ca$_n$, Cb$_n$, Cc$_n$, and Cd$_n$. The phase of the next ATC superframe will roll back to a value of 2, indicating a new distribution of the bits from the DDB. Additionally, the ATC pointer byte will roll back to a value of 25.

As described above, the preferred embodiment of the present invention utilizes an ATC transporting four frames of information. This embodiment is preferred as the minimum capacity of the above described ATC frame is insufficient to transmit a maximum capacity VT1.5 frame. Specifically, the maximum possible payload capacity of a single VT1.5 frame is 204 bits. This is the result of 24 payload bytes, a negative stuff byte and C1, C2, S1, and S2 all occurring in one frame. However the minimum payload capacity of a single ATC from of the preferred embodiment is 192 bits. This makes it impossible to immediately transport an incoming payload on a one frame in, one frame out basis.

Similarly, the maximum possible payload capacity of two consecutive VT1.5 frames is 397 bits. This is the result of 48 payload bytes, a negative stuff byte, C1, C2, S1, S2, and either I$_1$ or I$_3$ all occurring in the two frame sequence. However, the minimum capacity of two ATC frames of the preferred embodiment is 392 bits. This makes it impossible to immediately transport an incoming payload on a two frames in, two frames out basis.

Likewise, the maximum possible payload capacity of three consecutive VT1.5 frames is 590 bits. This is the result of 72 payload bytes, a negative stuff byte, C1, C2, S1, S2, I$_1$, and I$_3$ all occurring in the three frame sequence. However, the minimum capacity of three ATC frames of the preferred embodiment is 584 bits. This makes it impossible to immediately transport an incoming payload on a three frames in, three frames out basis.

Whereas, the maximum possible payload capacity of four consecutive VT1.5 frames is 783 bits. This is the result of 96 payload bytes, a negative stuff byte, C1, C2, S1, S2, I$_1$, I$_2$, and I$_3$ all occurring in the four frame sequence. The minimum capacity of four ATC frames is 784 bits. This makes it possible to transport an incoming payload on a four frames in, four frames out basis. Therefore, the ATC of the preferred embodiment, as discussed above, utilizes a four frames in, four frames out approach.

A SONET VT1.5 is a 1.728 Mb/s signal. However, the ATC of the preferred embodiment described above requires only 1.568 Mb/s of bandwidth to transport a VT1.5. During normal operation (no stuff events) the ATC uses 11 overhead bits of the 784 bits in the ATC superframe, or about 1.4% of overhead. During a negative stuff superframe only 3 bits of the 784 bits in the ATC superframe contain overhead, these three bits being Vx which indicates that a negative stuff has occurred and C$_1$ and C$_2$ which are the VT stuff control bits, or about 0.4% of overhead.

It should be appreciated that the four frames in, four frames out approach adopted by the preferred embodiment adds 500 μs of latency when converting a VT1.5 to an ATC. Moreover, an additional two frames of latency are added by the requirement that the VT1.5 to ATC algorithm perform polling of the stuff control bits. However, as the ATC superframe transmits the DDB and pointer byte at the beginning of the first frame of a superframe in the preferred embodiment, the downstream ATC to VT1.5 converter can begin re-assembling VT1.5s during the first received frame, thus minimizing latency associated with this function.

In addition to the above information passed from transmitter to receiver according to the present invention, frame and superframe information, i.,e., the location of DDB and printer bytes along with frame boundary information, is passed from the transmitter to the receiver. Since frame boundaries and DDB Pointer byte location information may be inferred from superframe boundaries using a free-running counter, the preferred embodiment of the present invention passes the superframe boundary information without discrete frame boundary information. For example, this may be provided externally such as via a 2 ms sync pulse present at both sides of the airlink with a fixed relationship.

Alternatively, in-band signaling may be utilized for frame synchronization. For example, the DDB of the preferred embodiment described above includes a spare bit, Vy. This bit can be used to insert a repetitive framing pattern similar to the 12 bit pattern used in DS-1 SF/D4 framing. A longer pattern to minimize false framing can also be used such as the 24 bit pattern used in DS-1 ESF framing. It should be appreciated that any proprietary pattern may also be used, if desired. Moreover, this capability also provides for "robbed-bit" signaling between the ATC encoder and the ATC decoder.

It shall be appreciated that, although reference to specific signaling standards and/or associated equipment has been made herein, the present invention is not limited to use with the above described signaling standards or equipment. Specifically, the present invention is neither limited to transporting VT data packets nor data associated with a SONET network. Likewise, the present invention is not limited to use over a wireless communication link. It is anticipated that the above described methods of identifing particular information in a stream of information to transmit in an ATC, condensing various overhead bytes and/or reducing the number of overhead bits, and packaging the information in a container suitable for transparent communication to a communication network device may be adapted for any of a number of signaling standards and associated equipment.

Although the present invention and its advantages have been described in detail, it should be understood that various changes, substitutions and alterations can be made herein without departing from the spirit and scope of the invention as defined by the appended claims.

What is claimed is:

1. A system for providing transparent communication of native network data packets over a non-native communication link, said system comprising:
   a first converter coupled to a communication network, wherein said first converter is adapted to accept a high level synchronous data packet native to said communication network which includes asynchronous payload and map the high level synchronous data packet to a non- native transport container without dropping the asynchronous payload out of the native data packets;
   a second converter disposed remotely from said communication network, wherein said second converter is adapted to accept said non-native transport containers and to reassemble said accepted containers into said native network data packets; and
   a communication link discrete from said communication network providing information communication between said first converter and said second converter, wherein said native network data packets include frames of information including payload and overhead information, and wherein said first converter compresses said overhead information for transmission to said second converter, and
   wherein compression of said overhead information by said first converter includes collecting at least one frame in addition to the frames to be transmitted in a particular said non-native transport container.

2. The system of claim 1, wherein said non-native transport container includes pointer information indicating a placement of ones of said frames within said transport container.

3. The system of claim 2, wherein said pointer information includes phase information indicating an order with respect to said frames.

4. The system of claim 3, wherein said frames include overhead information within each of said frames, and said phase information indicates an order of said overhead information.

5. The system of claim 2, wherein a portion of said non-native transport container associated with said pointer information carries payload information when a negative stuff operation occurs and a special condition is met.

6. The system of claim 5, wherein said special condition is a frame of said frames aligns with an end of said native network data packet and a particular order of said frames is not present.

7. The system of claim 2, wherein said pointer information also indicates the occurrence of a positive stuff event.

8. The system of claim 7, wherein said pointer information is complemented to indicate said positive stuff event.

9. The system of claim 1, wherein said communication network comprises a SONET communication network.

10. The system of claim 9, wherein said native network data packets comprise VT1.5 data packets.

11. The system of claim 10, wherein said asynchronous payload comprises DS-1 data packets.

12. The system of claim 1, wherein said communication link comprises a wireless communication link.

13. The system of claim 12, wherein said wireless link provides radio frequency communication in the millimeter wave spectrum.

14. The system of claim 12, wherein said communication link is a communication link of a point to multi-point communication system, and wherein said first converter is disposed at a hub of said point to multi-point communication system.

15. The system of claim 1, wherein said first converter includes an encoder to encode said non-native transport container for communication to said second converter via said communication link.

16. The system of claim 15, wherein said encoder comprises a Reed-Solomon error detection/correction algorithm.

17. A method for providing transparent communication of data formatted for use according to a network infrastructure from a first device over an information communication link to a second device, said method comprising the steps of:
   accepting data formatted for use according to said network infrastructure at said first device, wherein said format of said data includes a transport container associated with said network infrastructure and said transport container includes preformatted payload;
   converting at said first device the network transport container of said accepted data to a link transport container, wherein said conversion of said network transport container to said link container does not require dropping said preformatted payload out of said network transport container; and
   de-converting at said second device the link transport container to provide said accepted data in a format for use by said remote device,
      wherein said network transport container is a virtual tributary of a SONET data stream, and
      wherein said converting step comprises the step of compressing overhead information of said virtual tributary for transmission over said information communication link in said link transport container, and
      wherein said compressing step comprises the step of collecting information associated with a virtual tributary other than a current virtual tributary to be transmitted in said link transport container.

18. The method of claim 17, wherein said converting step further comprises the step of including pointer information within said link transport container indicating a relative location of said preformatted payload within said link transport container.

19. The method of claim 18, wherein said converting step further comprises the step of:
   including phase information indicating an order of overhead information of said preformatted payload.

20. The method of claim 18, wherein said step of including pointer information comprises the step of:
   determining the presence of a negative stuff event in the network transport container and including said pointer information only if a predefined condition is met.

21. The method of claim 18, wherein said step of including pointer information comprises the step of:

logically inverting said pointer information to indicate the occurrence of a positive stuff event.

22. The method of claim 17, wherein said information communication link comprises a wireless communication link.

23. The method of claim 22, wherein said information communication link comprises a communication link of a point to multi-point commnunication system.

24. A method for providing transparent communication of virtual tributaries associated with a SONET network over an airlink, said method comprising the steps of:

coupling a first transport container converter to said SONET network;

coupling a second transport container converter to a remote device;

establishing an information communication link between said first converter and said second converter;

accepting SONET data streams including said virtual tributaries at one of said first or second converters;

converting ones of the accepted virtual tributaries to airlink transport containers;

transmitting said airlink transport containers to the other one of said first or second converters; and converting said airlink transport containers to said virtual tributaries, wherein said converting step comprises the step of compressing overhead information of said virtual tributary by polling stuff control bits of the virtual tributary to drop redundant bits, and wherein said compressing step comprises the step of collecting information associated with a virtual tributary other than a current virtual tributary to be transmitted in said airlink transport container.

25. The method of claim 24, wherein said converting step comprises the step of including pointer information within said link transport container indicating a position at which to insert overhead information in said virtual tributaries converted from said airlink transport containers.

26. The method of claim 25, wherein said converting step further comprises the step of:

including phase information indicating an order of overhead information of said virtual tributaries.

27. A system for providing transparent communication of VT1.5 transport containers of a SONET network over an airlink, said system comprising:

a first transport container converter coupled to said SONET network accepting VT1.5 transport containers from said SONET network and converting ones of the accepted VT1.5 transport containers to airlink transport containers;

a second transport container converter coupled to a remote device converting airlink transport containers to VT1.5 transport containers; and an information communication link between said first converter and said second converter, wherein said airlink transport containers converted by said first converter are transmitted to said second converter via said information communication link, wherein said airlink transport container includes a distributed data byte, and wherein said distributed data byte comprises at lest one information bit, at least one stuff bit, and at least one control bit.

28. The system of claim 27, wherein said airlink transport container comprises four frames of information.

29. The system of claim 28, wherein said four frames of information include a total of four 24 byte payload packets.

30. The system of claim 28, wherein said four frames of information are not all of a same byte length.

31. The system of claim 30, wherein at least one of said four frames of information is 24 bytes and another one of said four frames of information is 25 bytes.

32. The system of claim 27, wherein said distributed data byte further comprises at least one bit indicating a negative stuff event.

33. The system of claim 27, wherein said airlink transport container includes a pointer byte.

34. The system of claim 33, wherein said pointer byte comprises at least one relative location information bit and at least one phase information bit.

* * * * *